US009921119B2

(12) United States Patent
Walz et al.

(10) Patent No.: US 9,921,119 B2
(45) Date of Patent: Mar. 20, 2018

(54) METHOD, DEVICE AND SYSTEM FOR CHECKING A DEVICE FOR A VEHICLE FOR DETECTING AN IMPACT

(71) Applicant: Robert Bosch GmbH, Stuttgart (DE)

(72) Inventors: Michel Walz, Eningen (DE); Alexander Herrmann, Reutlingen (DE); Denis Mader, Suzhou (CN); Gunther Lang, Stuttgart (DE); Hansjoerg Markus Hild, Plymouth, MI (US); Daniel Schoenfeld, Abstatt (DE); Michael Schmid, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 14/915,289

(22) PCT Filed: Jul. 18, 2014

(86) PCT No.: PCT/EP2014/065496
§ 371 (c)(1),
(2) Date: Feb. 29, 2016

(87) PCT Pub. No.: WO2015/028199
PCT Pub. Date: Mar. 5, 2015

(65) Prior Publication Data
US 2016/0209283 A1  Jul. 21, 2016

(30) Foreign Application Priority Data

Aug. 30, 2013  (DE) ........................ 10 2013 217 340

(51) Int. Cl.
*G01L 5/00*  (2006.01)
*G01M 17/007*  (2006.01)
*B60R 21/0136*  (2006.01)
*G01L 27/00*  (2006.01)

(52) U.S. Cl.
CPC ........ *G01L 5/0052* (2013.01); *B60R 21/0136* (2013.01); *G01L 27/007* (2013.01); *G01M 17/007* (2013.01); *G01M 17/0078* (2013.01)

(58) Field of Classification Search
CPC .. G01L 5/0052; G01L 27/007; G01M 17/007; G01M 17/0078; B60R 21/0136
See application file for complete search history.

(56) References Cited

U.S. PATENT DOCUMENTS 8,128,140 B2 * 3/2012 Tanabe ................ B60R 21/0136
293/117
9,067,553 B1 * 6/2015 Ghannam ............. B60R 19/483
(Continued)

FOREIGN PATENT DOCUMENTS

CN  103814283 A  5/2014
DE  102 32 523 A1  1/2004
(Continued)

OTHER PUBLICATIONS

Machine translation of DE 102012101859.*
(Continued)

*Primary Examiner* — David Bolduc
(74) *Attorney, Agent, or Firm* — Maginot, Moore & Beck LLP

(57) ABSTRACT

Method for checking a device for a vehicle for detecting an impact, in particular an impact with a pedestrian, by means of at least one impact-sensing means which is based on at least a first volume, in particular by means of an impact-sensing means which is based on at least one hose, a device having means for carrying out such a method and a corresponding system, in which at least one first variable is acquired, wherein the at least one first variable represents a pressure and/or a volume and/or a change in pressure and/or a change in volume in the first volume, and a result of the checking of the device is determined as a function of a profile of the at least one first variable.

8 Claims, 8 Drawing Sheets

(56) References Cited

U.S. PATENT DOCUMENTS

| | | | | |
|---|---|---|---|---|
| 2011/0094305 A1* | 4/2011 | Adam | ................. | G01L 19/0645 |
| | | | | 73/708 |
| 2011/0239789 A1* | 10/2011 | Takahashi | ............. | B60R 19/483 |
| | | | | 73/862.581 |
| 2012/0271509 A1* | 10/2012 | Nehls | ................. | B60R 21/0136 |
| | | | | 701/34.4 |
| 2014/0207330 A1 | 7/2014 | Meir et al. | | |
| 2014/0260691 A1* | 9/2014 | Hammerschmidt | .. | G01L 5/0052 |
| | | | | 73/862.626 |

FOREIGN PATENT DOCUMENTS

| | | | | |
|---|---|---|---|---|
| DE | 10 2011 011 963 A1 | 8/2012 | | |
| DE | 10 2011 083 027 A1 | 3/2013 | | |
| DE | 102012101859 A1 * | 9/2013 | ......... | B60R 21/0136 |
| DE | 102014208649 A1 * | 11/2015 | ......... | B60R 21/0136 |
| EP | 2 758 762 B1 | 7/2014 | | |
| JP | 2006-512245 A | 4/2006 | | |
| JP | 2014-526703 A | 10/2014 | | |
| WO | 2013/041383 A2 | 3/2013 | | |
| WO | WO 2015024562 A1 * | 2/2015 | ......... | B60R 21/0136 |

OTHER PUBLICATIONS

International Search Report corresponding to PCT Application No. PCT/EP2014/065496, dated Nov. 3, 2014 (German and English language document) (5 pages).

* cited by examiner

Fig. 4
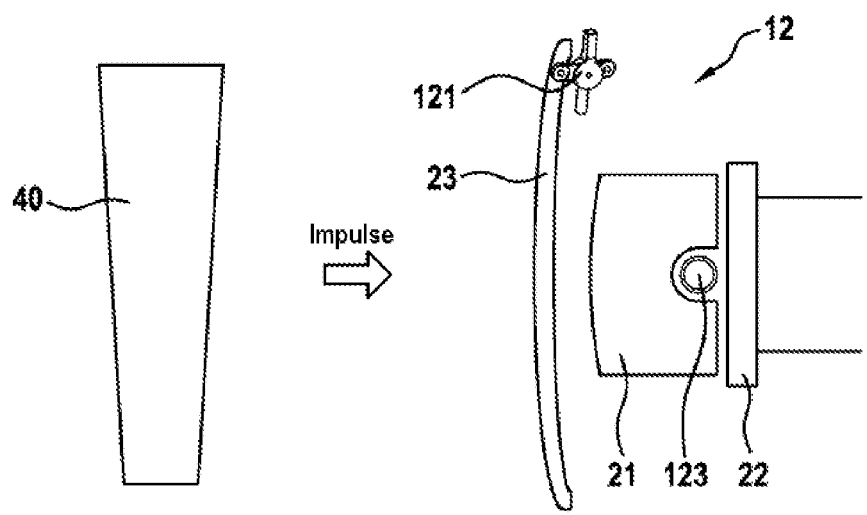
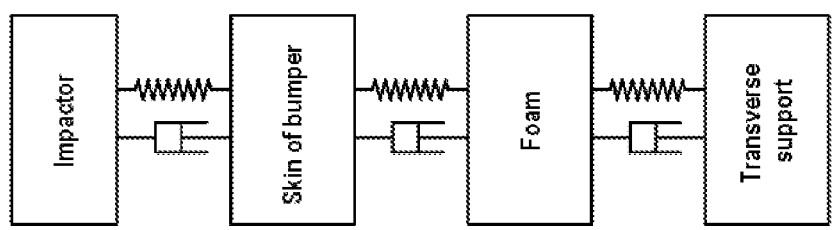

METHOD, DEVICE AND SYSTEM FOR CHECKING A DEVICE FOR A VEHICLE FOR DETECTING AN IMPACT

This application is a 35 U.S.C. § 371 National Stage Application of PCT/EP2014/065496, filed on Jul. 18, 2014, which claims the benefit of priority to Serial No. DE 10 2013 217 340.7, filed on Aug. 30, 2013 in Germany, the disclosures of which are incorporated herein by reference in their entirety.

The present disclosure concerns a method for checking a device for a vehicle for the detection of an impact, a matching device as well as a corresponding system.

Pedestrians and cyclists are particularly at risk in everyday road traffic. The number of the injured and dead is relatively large. In order to reduce this number, appropriate legislation for the protection of pedestrians and cyclists was enacted. The aim: The vehicle must provide a suitable safety zone and must absorb or reduce the impact energy during the collision. An efficient solution is provided by active pedestrian protection, which detects the accident with sensors and triggers suitable person protection means, such as raising the engine bonnet or external airbags.

A sensor for the detection of an impact based on the detection of a change of pressure in a hose system with one or more pressure sensors. The system is installed in or on the front or rear bumper of the vehicle. A deformation of the bumper during an impact with a pedestrian leads to a change of volume and hence to a change of pressure in the hose system. The change of pressure is detected by the pressure sensor and is provided as impact information to a control unit for the activation of person protection means.

BACKGROUND

Very diverse systems are used for the detection of impacts, in particular of pedestrians, on vehicles. The most well-known systems use acceleration measurement sensors that are disposed in the front or rear area of a vehicle. Newer systems use a hose filled with a fluid medium with a pressure measurement sensor disposed on at least one end thereof.

Because systems for the detection of impacts are safety critical systems, it is essential to use a method for checking said systems.

SUMMARY

Against this background, with the present disclosure a method for checking a device for a vehicle for the detection of an impact, in particular of a pedestrian impact, by means of at least one impact detection means based on at least one first volume, in particular based on at least one hose, a device with a means of carrying out such a method as well as a suitable system are presented. Advantageous embodiments are revealed by the following description.

The present disclosure represents a simple implementation of the checking functionality of a device for the detection of impacts.

Therefore a method for checking a device for a vehicle for the detection of an impact, in particular of a pedestrian impact, by means of at least one impact detection means based on at least one first volume, in particular based on at least one hose, is presented, wherein at least one first variable is detected, wherein the at least one first variable represents a pressure and/or a volume and/or a change of pressure and/or a change of volume in the first volume and a result of the checking of the device is determined depending on a profile of the at least one first variable.

Furthermore, a device with means for carrying out such a method is presented.

Further, a system for checking a device for a vehicle for the detection of an impact by means of at least one impact detection means based on at least one first volume, in particular on a hose, is presented, wherein the device comprises at least one first detecting device for detecting a first variable representing a pressure and/or a volume and/or a change of pressure and/or a change of volume in the at least one first volume, and the system determines a result of checking the device depending on a profile of the at least one first variable.

The first volume can for example be understood to mean a cavity in a bumper of a vehicle, for example in the absorbent foam of the vehicle. The volume is effectively formed by a hose that is mounted in or on the front or rear bumper of a vehicle. The hose can for example be mounted in a groove in the absorbent foam. The hose preferably consists of a material, such as silicon for example, that is resistant to ambient influences. It is sufficient if the hose is filled with air. Optionally, the hose can also be filled with a different fluid, such as a gas or a liquid.

By means of a suitable detecting device, for example a pressure sensor, a variable can be detected that is representative of a pressure or a volume or a pressure change or a change of volume in the at least one first volume. If said variable is detected a number of times in a time sequence, a profile of the variable can be determined therefrom. Said profile can be suitably analyzed. Depending on the profile of the variable, a result of checking the device can be determined. If for example the detected variable decreases more rapidly than envisaged over a given period of time, it can be concluded therefrom that the volume or the hose has a leak.

In one advantageous embodiment of the method or of the system, the at least one first variable is detected by at least one first detecting device, wherein the at least one first detecting device communicates both with the at least one first volume and also with the surroundings of the vehicle, wherein the communications with the surroundings takes place by means of a compensation means and the profile of the at least one first variable is compared with a target profile, wherein the target profile is dependent on the compensation means and the result of the checking of the device is determined depending on the comparison.

In order to make the method or the system more robust against changes in the ambient conditions, such as a change of the temperature and a change of the air pressure, it is useful to adapt the conditions occurring in the volume or the hose to the ambient conditions. For this purpose, a compensation means can be used, such as for example a pressure compensation element. A pressure compensation element is typically mounted on the detecting device, for example the pressure sensor. In addition or alternatively, the compensation means can also be mounted on the hose, which provides the first volume. A pressure compensation element connects two volumes, so that the conditions in the first volume are equalized with the conditions in the second volume over a certain time. The certain time that is necessary for this purpose is representative of the regulating rate of the compensation means, the size of the compensation means and the differences in conditions in the volumes. If said variables are known, the profile of the detected variable can be compared with a target profile that is dependent on the aforementioned properties of the compensation means.

If the pressure in the hose rises, for example because of a temperature increase, then a pressure balance with the surroundings of the vehicle occurs by means of the compensation means. Depending on the properties of the compensation means used, the balance occurs in a target profile. If a balance occurs faster during this, then a leak in the hose can be concluded. If a balance occurs more slowly, then a blockage can be concluded.

In an advantageous embodiment of the method or of the system, at least one second variable is detected, wherein the at least one second variable represents a pressure or a volume or a change of pressure or a change of volume in the at least one first volume and the at least one first variable is verified by means of the at least one second variable, in particular using at least one state equation for ideal fluids, or the at least one first variable is correlated with the at least one second variable and the result of checking the device is determined depending on the verification or the correlation.

The two detected variables can then be validated by using the state equation for ideal fluids (thermal state equation for ideal gases). During this the two detected variables are processed on the assumption that there is a homogeneous pressure and temperature distribution in the first volume.

The two detected variables correlate if their behavior matches each other's. This can be understood to mean that if one of the two detected variables changes, the profiles of the two detected variables increase or decrease to the same extent.

In this way there is a simple possibility to check the device for the detection of impacts without for example having to resort to third variables.

In one advantageous embodiment of the method or of the system, the at least one first variable is detected by a first detecting device and the at least one second variable is detected by a second detecting device, wherein the first and second detecting devices are separate detecting devices and the first detecting device and the second detecting device each communicate with the at least one first volume.

The checking of the device can be improved if a second detecting device that is separate from the first detecting device is mounted on the volume or the hose. In one embodiment with a hose, this can for example be achieved by mounting a pressure sensor on each end of the hose.

It is thereby achieved that an incorrectly operating detecting device can be detected easily and cannot result in malfunctions of the system.

In one advantageous embodiment of the method or of the system, at least one third variable is detected, wherein the at least one third variable represents a pressure or a change of pressure or a temperature or a change of temperature, in particular of the surroundings of the vehicle, or an altitude at which the vehicle is located, or a change of altitude that the vehicle carries out, wherein the at least one third variable is detected by a third detecting device and the at least one first variable or the at least one second variable is correlated with the at least one third variable and the check result is determined depending on the correlation.

In a further advantageous embodiment of the method or of the system, the third detecting device is a separate detecting device.

The at least one third variable can be provided for this for example by a so-called combination instrument or a lateral pressure sensor, for example for detecting side impacts. In this case the variable is detected or at least aggregated by the combination instrument or the lateral pressure sensor and is then made available in the vehicle by means of communications means, such as for example the CAN bus or the Flex-Ray bus, to the process or the device that is performing the process.

In addition to the temperature in the surroundings of the vehicle, the detected temperature or change of temperature can also be the temperature in the engine compartment. This is due to the fact that the device for the detection of an impact that is to be checked by the method according to the disclosure is mounted in or on the bumper of a vehicle and can therefore be displaced past and close to the oil cooler. During operation of the vehicle, the oil cooler radiates temperature in a manner such that the method according to the disclosure can be carried out just as a result of the rise in temperature.

The detected pressures of the surroundings or the changes of pressure in the surroundings of the vehicle can be artificially induced pressures or changes of pressure. These can be caused specifically in test laboratories, workshops or car washes or the like. An inexpensive version involves producing the same by various driving situations. For example, by driving at various altitudes. For this the fact is exploited that the ambient pressure becomes lower as the vehicle's altitude increases.

In one advantageous embodiment of the method, a correction factor that is dependent on the at least one third variable is used on the at least one first variable or on the at least one second variable.

By means of such an embodiment of the method, unwanted temperature or pressure influences on the device to be checked can be compensated and the method according to the disclosure or the system according to the disclosure can be made more accurate or at least more robust as a result.

In an alternative embodiment of the method or of the system, a leak or a blockage of the at least one first volume is determined as the result of the check.

In an advantageous embodiment of the method, the leak or the blockage is determined if the at least one first variable or the at least one second variable does not correlate with the at least one third variable to within predetermined limits.

A leak can for example be detected if a change of the third variable does not result in changes to the first or second variable to the corresponding or expected extent. For example, if the temperature rises but the detected pressures do not rise or only rise significantly less, because equalization with the ambient pressure occurs too fast or is indefinite owing to there being a leak. If as a result of a change of temperature the detected pressures increase significantly faster and possibly at different rates, then a blockage can be concluded because a significantly smaller volume is measured or two unequal volumes are measured and external changes of temperature act proportionally to the measured volume. As a result, the result of checking the device for the detection of impacts can be determined significantly more accurately by means of the advantageous embodiment.

In one advantageous embodiment of the method, the at least one first variable or the at least one second variable correlates with the at least one third variable if, following a predetermined period of time, wherein the period of time in particular depends on the at least one third variable or the compensation means, the at least one first variable or the at least one second variable essentially has a predetermined relationship to the at least one third variable.

With the device for the detection of impacts that is to be checked by the method according to the disclosure, the at least one first variable or the at least one second variable follows the at least one third variable by design. By design because the first volume, which is detected by the first or the second variable, communicates with the second volume, which is detected by the third variable, but by means of a compensation element. Said compensation element causes changes that are detected to the third variable, which acts on the at least one first or at least one second variable only after a time delay. This consequently means that for example a leak may cause the at least one first or second variable to already have a predetermined relationship with the third variable before the expiry of the predetermined period of time. This is because equalization between the two measured volumes can occur faster by means of the leak. Therefore, said advantageous embodiment results in so-called false-negative results, i.e. where a fault, for example a leak or a blockage, is incorrectly detected although there is no fault, being avoidable, and so-called positive-false results being better detectable. A low false-negative rate increases the acceptance of the method by customers and users. This is achieved by the at least one first variable or the at least one second variable having to have a predetermined relationship with the third variable after the expiry of a predetermined period of time, i.e. not immediately.

The method according to the disclosure or the advantageous embodiment of the method according to the disclosure can be carried out cyclically. The robustness of the system can be increased by a cyclical performance, because the system is checked regularly and not just at the beginning or at the end or only during workshop visits by the vehicle.

BRIEF DESCRIPTION OF THE DRAWINGS

Exemplary embodiments of the disclosure are described below using figures. In the figures:

FIG. 4 shows the representation of a chain of action.

DETAILED DESCRIPTION

Figure 1:
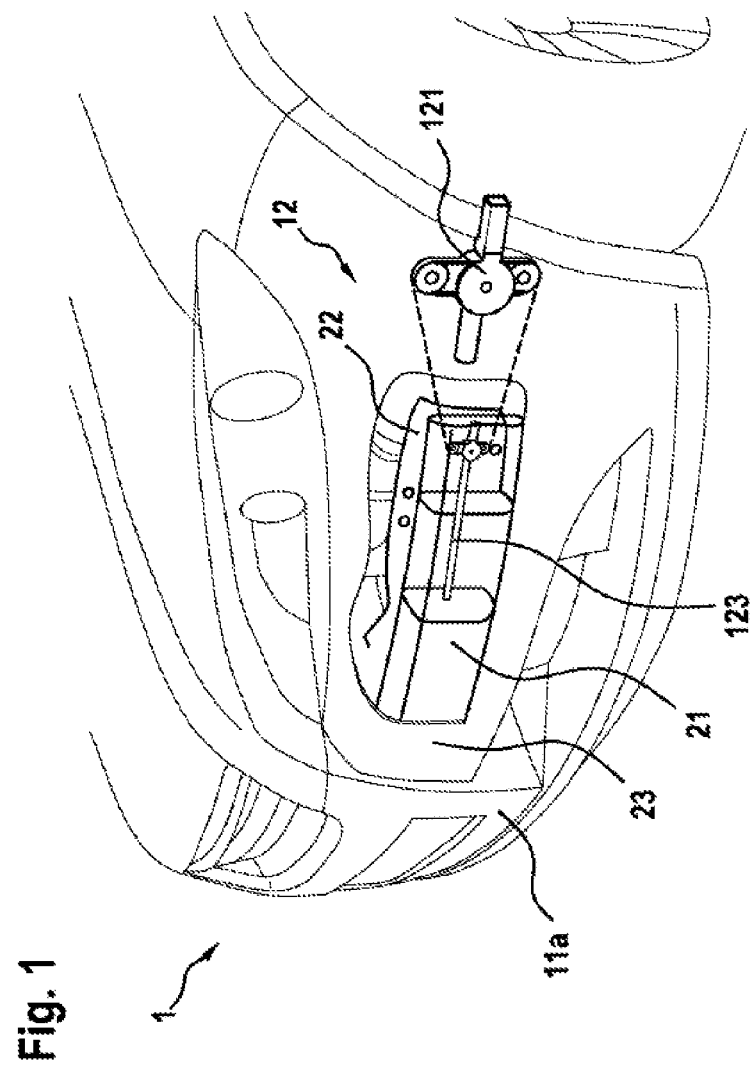
FIG. 1 shows an overview representation of an embodiment of a device for the detection of impacts.

FIG. 1 shows the front section of a vehicle (1), in or on the front bumper (11a) of which a device (12) for the detection of impacts is disposed. A first detecting device (121) as well as a first volume (V1) in the form of a hose (123) can be seen on the device (12) in the illustrated embodiment. The first detecting device (121) is also shown greatly enlarged here. In this case the first detecting device (121) is disposed on one end of the hose (123).

It can easily be seen that a second detecting device (122) can be disposed on the other end of the hose (123).

It is easy to imagine that the device (12) for the detection of impacts can also be mounted in or on the rear bumper (11b) of the vehicle (1).

An embodiment of the device for the detection of impacts that is not shown comprises only one detecting device (121/122) that is disposed on one of the ends of the hose (123).

A further embodiment of the device for the detection of impacts that is not shown comprises an optionally shaped volume as the first volume (V1), for example an optional cavity in the front (11a) or rear (11b) bumper.

Figure 2:
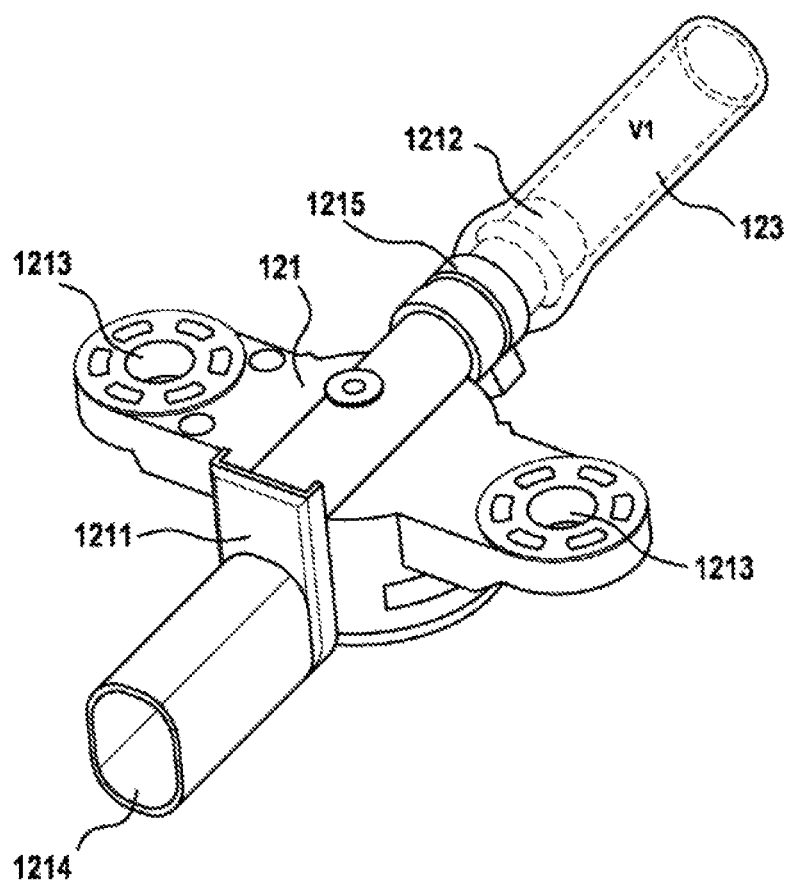
FIG. 2 shows a detailed view of a detecting device according to the disclosure.

FIG. 2 shows a detailed view of the detecting device (121/122) according to the disclosure. The first volume (V1) in form of a hose (123) can clearly be seen mounted on a protrusion (1212) of the housing (1211) of the detecting device (121/122). In the illustrated embodiment, the hose (123) is attached with a binder (1215). Moreover, the housing (1211) comprises mounting brackets (1213), by means of which the detecting device (121/122) can be mounted on the vehicle (1). The plug connector (1214) by means of which the detecting device (121) can be connected to a communications and power supply connection can also be clearly seen. Typically, use is made of standardized connections such as PSI5, SPI, CAN or Fley-Ray. Other communications or power supply connections are also conceivable here.

Figure 3:
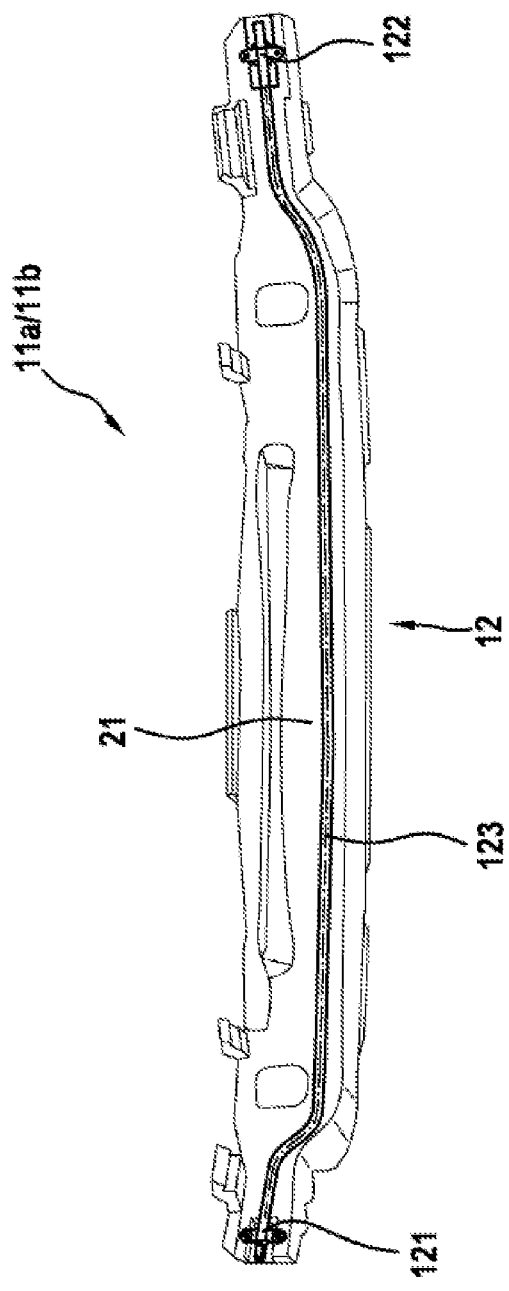
FIG. 3 shows the integration of a device (12) for the detection of impacts in the front or rear section (11a/11b) of a vehicle (1)

FIG. 3 shows the integration of a device (12) for the detection of impacts in the front or rear section (11a/11b) of a vehicle (1). Detecting devices (121/122) are disposed on each end of the first volume (V1) in the form of a hose (123). The hose (123) runs in a groove of the absorber foam (21). The detecting devices (121/122) are also disposed in special trenches in the pedestrian foam (21).

FIG. 4 shows the representation of a chain of action from the impactor to the transverse support (22) of the vehicle (1). The impactor shown represents the object that impacts the vehicle (1) or that is impacted by the vehicle. The skin of the bumper (23) is part of the outer shell of the vehicle (1). Behind this are the absorbent foam (21) and finally the transverse support (22) of the vehicle (1). As shown, each element in the chain of action is a separate spring mass system.

The impulse that acts on the vehicle (1) as a whole as a result of the impact of the impactor (40) passes via the skin of the bumper (23) to the absorbent foam (21). The device (12) according to the disclosure is disposed in or on the absorbent foam. The impulse is transmitted by means of the absorbent foam (21) and onto the hose (123) of the device (12) and is detected by the detecting devices (121/122). Depending on the strength and severity of the impulse, the type of the impactor is detected and suitable protective measures are implemented or activated. If a pedestrian is struck, the objective is to substantially avoid injuries to the pedestrian.

Figure 5:
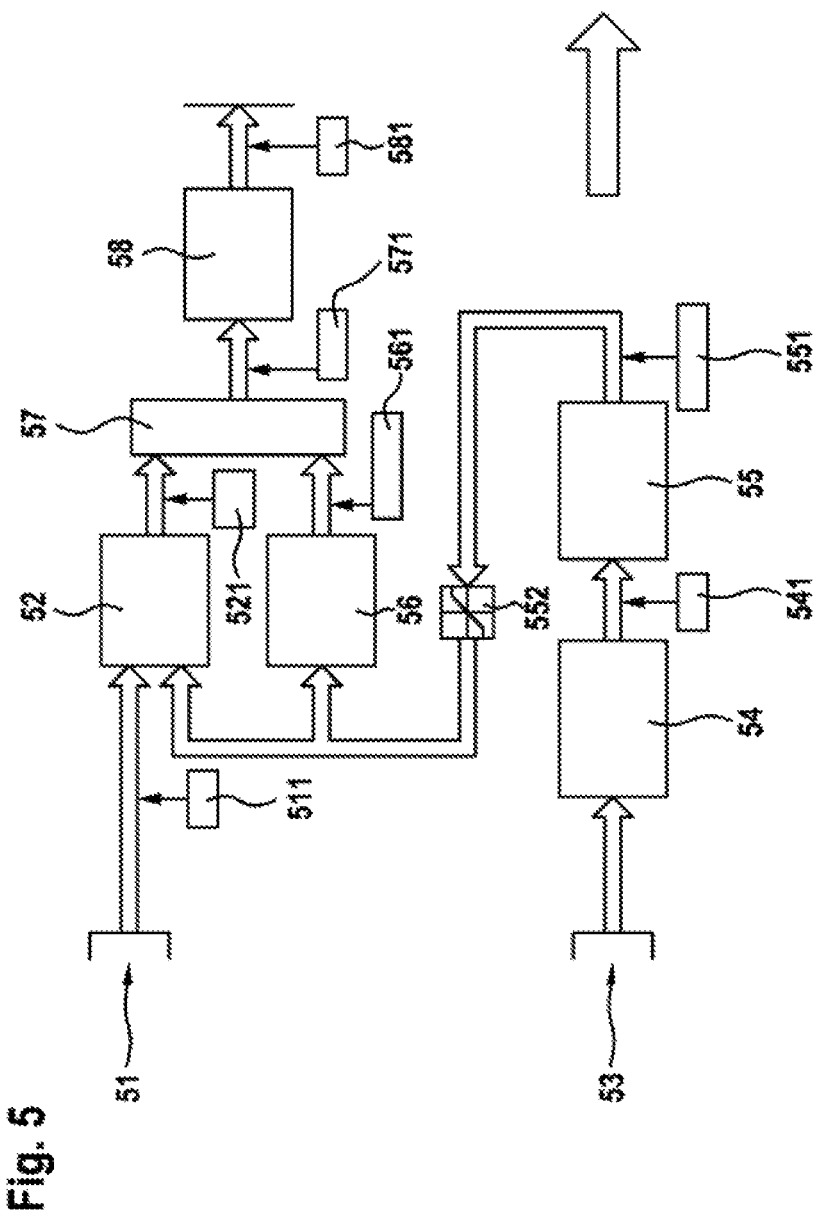
FIG. 5 shows a block diagram of a detecting device of a device for the detection of impacts.

FIG. 5 shows a block diagram of a detecting device (121, 122) of a device for the detection of impacts. In this diagram the double digit reference characters represent processing steps, in particular digitization steps. The three-digit reference characters represent intermediate values that are passed from one processing step to the next processing step. The detecting device (121, 122) comprises a sensor element 51 for detecting a (physical) variable and a temperature diode 53. The temperature diode 53 detects the internal temperature on or in the surroundings of the sensor element 51. The temperature detected in this way is reprocessed (54 to 56 or 52), in particular digitized 552, and is fed into the detected physical variable 57 of the sensor element 51. The reprocessed variable 58 is passed to the processing devices that are connected to the detecting device (121, 122) as values 58 representing the measured physical variable. According to the disclosure, besides the values representing the measured physical variable, the detected internal temperature 55 on or in the surroundings of the sensor element 51 is also passed from the detecting device (121, 122) to the processing devices connected to the detecting device (121, 122). The detected temperature value 55 can be used as a third variable in one embodiment of the method according to the disclosure.

The transmission to the processing devices that are connected to the detecting device (121, 122) can take place here by means of communications means that are present in the vehicle, such as the standardized transfer protocol PSI5 or CAN or Flex-Ray.

Figure 6:
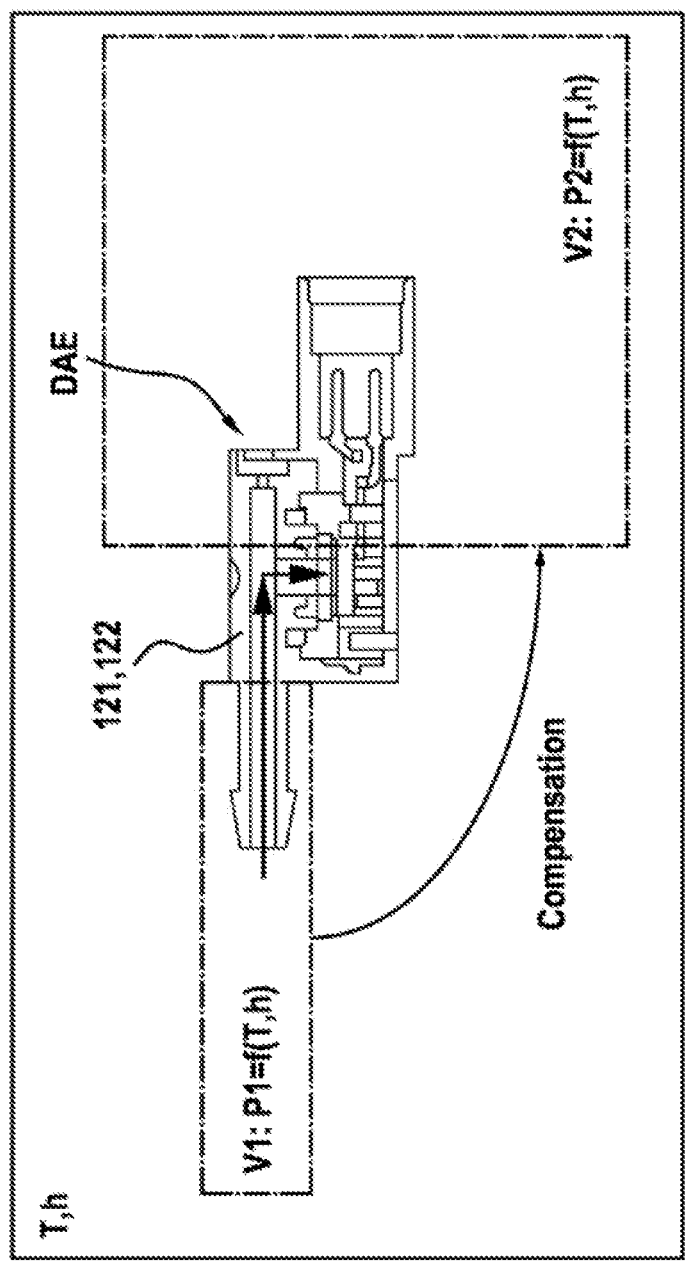
FIG. 6 shows a schematic side view of a detecting device of a device for the detection of impacts.

FIG. 6 shows a schematic side view of a detecting device (121, 122) of a device for the detection of impacts. The detecting device (121, 122) in the illustrated embodiment communicates with a first volume (V1), in which there is a pressure P1 that depends on the prevailing temperature T and the altitude h at which the first volume V1 is disposed. Furthermore, the detecting device communicates by means of a pressure compensation element DAE with a second volume V2, in which there is likewise a pressure P2 that is dependent on the prevailing temperature T and the altitude h. Both volumes V1, V2 are essentially influenced by the same temperature T and altitude h. By means of the pressure compensation element DAE, after a certain time a compensation occurs between the pressures P1 and P2. The speed of the compensation depends here on the difference between the pressure P1 and the pressure P2 and the properties of the pressure compensation element DAE.

One embodiment of the method according to the disclosure makes use of said relationship between the difference between the pressures P1 and P2 and the properties of the pressure compensation element in order to check the device for the detection of impacts.

For example, a leak in the volume or the hose of the hose-based impact detection means can be concluded if the speed until balance between the volume V1 and the volume V2 has occurred does not agree with an expected speed. The anticipated speed essentially depends on the difference between the pressures P1 and P2 as well as the properties of the pressure compensation element DAE.

Figure 7A:
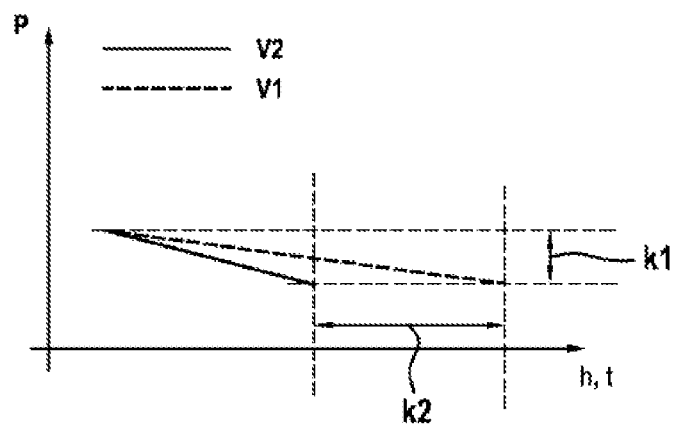
FIG. 7a shows a profile diagram of a first or second variable in relation to a third variable.

FIG. 7*a* shows a profile diagram of a first or a second variable as a function of a third variable. In the diagram the pressure P is plotted on the ordinate and the profile of the altitude h and the time t are plotted on the abscissa. The profile of the first or second variable is represented by the characteristic V1. The profile of the third variable is represented by the characteristic V2. A situation is illustrated in which the pressure P in the second volume V2 is decreased owing to the increase in the altitude h. The second volume represents the surroundings of the vehicle in the context of the present disclosure. The vehicle is therefore on an ascent. The reduced pressure in the surroundings of the vehicle affects the pressure in the first volume. Equalization occurs at a defined rate by means of the pressure compensation element. The rate k2 essentially depends on the difference k1 between the pressure P(V1) in the first volume V1 and the pressure P(V2) in the second volume V2.

Figure 7B:
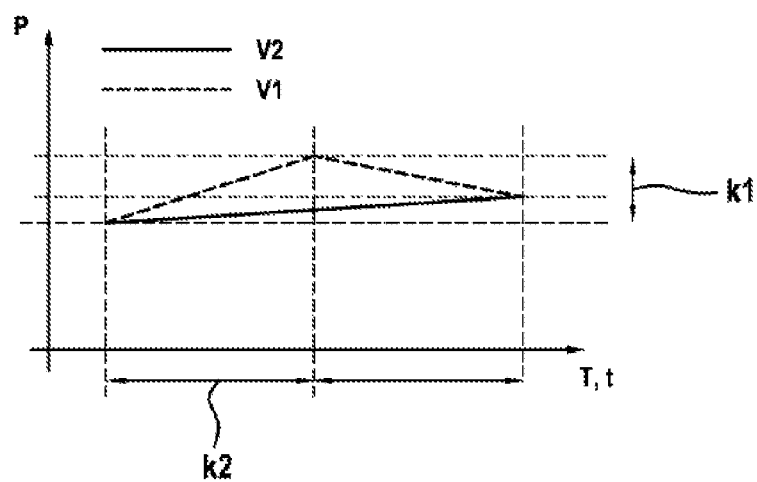
FIG. 7b shows a further profile diagram of a first or second variable in relation to a third variable.

FIG. 7*b* shows a further profile diagram of a first or a second variable as a function of a third variable. In the diagram the pressure P is plotted on the ordinate and the profile of the temperature T and the time t are plotted on the abscissa. The profile of the first or second variable is illustrated by the characteristic V1. The profile of the third variable is illustrated by the characteristic V2. A situation is illustrated in which the pressure P(V1) in the first volume V1 increases faster than in the second volume V2 owing to the increase in the temperature T. For the purposes of the present disclosure, the first volume V1 represents the hose of the tubular impact detection means. For the purposes of the present disclosure, the second volume V2 represents the surroundings of the vehicle. As a result of the first volume V1 being significantly smaller in comparison to the second volume V2, it is clear that a change of temperature has a greater effect on the pressure P(V1) in the first volume V1. In the diagram this is clear to see in the faster rise of the pressure P(V1). At the same time, equalization with the pressure P(V2) of the second volume V2 occurs by means of the pressure compensation element. This is evident from the bend in the profile curve of P(V2). Finally, after a certain time k2 has elapsed, full equalization with the pressure in the volume V1 and the pressure in the volume V2 has occurred.

In this case the time k2 anticipated for equalization also depends on the difference k1 between the pressure P(V1) and P(V2) and the properties of the pressure compensation element.

Figure 8:
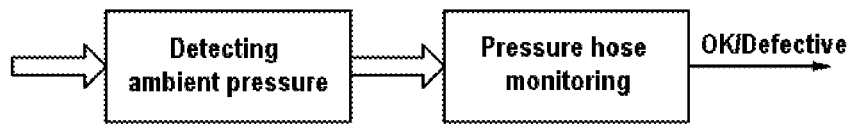
FIG. 8 shows a block diagram of the method according to the disclosure.

FIG. 8 shows a block diagram of an embodiment of the method according to the disclosure. In a first step of this, detection of the ambient pressure is performed. Said detection then influences the pressure hose monitoring of the tubular means for impact detection according to the present disclosure. The detection of the ambient pressure—i.e. the detection of the pressure in the second volume (V2) in the context of the present disclosure—therefore corresponds to the determination of the third variable that is correlated with the detected first or second variable within the scope of the method for checking the device for the detection of an impact, in order for example to detect a leak or a blockage of the tubular impact detection means. The result of said checking is illustrated in the block diagram by the arrow with the legend "OK/Defective".

The invention claimed is:

1. A method for checking an impact detection device for a vehicle comprising:
   detecting, with a pressure sensor, a first pressure level of fluid in a hose of the impact detection device at a first time;
   operating a valve to place the hose in fluid communication with a volume that is external to the hose;
   detecting, with the pressure sensor, a second pressure level of the fluid in the hose at a second time after operation of the valve, the second time being later than the first time; and
   identifying, with a processing device, a blockage in the hose in response to a difference between the first pressure level and the second pressure level exceeding a predetermined threshold.

2. The method of claim 1 wherein the pressure sensor detects the first pressure level of the fluid relative to an ambient pressure level in the volume that is external to the hose.

3. The method of claim 1 wherein the pressure sensor detects the first pressure level of air within the hose and the second pressure level of air within the hose.

4. The method of claim 1 wherein the operating of the valve places the hose in fluid communication with a surrounding of the vehicle that includes the impact detection device.

5. An impact detection device for a vehicle comprising:
   a hose;
   a valve connected to the hose;
   a pressure sensor configured to detect a pressure level of a fluid in the hose; and a processing device connected to the valve and the pressure sensor, the processing device being configured to:
- detect a first pressure level of fluid in a hose of the impact detection device at a first time with the pressure sensor;
- operate the valve to place the hose in fluid communication with a volume that is external to the hose;
- detect a second pressure level of the fluid in the hose with the pressure sensor at a second time after operation of the valve, the second time being later than the first time; and
- identify a blockage in the hose in response to a difference between the first pressure level and the second pressure level exceeding a predetermined threshold.

6. The impact detection device of claim 5 wherein the pressure sensor detects the first pressure level of the fluid relative to an ambient pressure level in the volume that is external to the hose.

7. The impact detection device of claim 5 wherein the pressure sensor detects the first pressure level of air within the hose and the second pressure level of air within the hose.

8. The impact detection device of claim 5 wherein the operating of the valve places the hose in fluid communication with a surrounding of the vehicle that includes the impact detection device.

* * * * *